T. VanFossen.
Harvester Rake.
Nº 8667.   Patented Jan. 20, 1852.
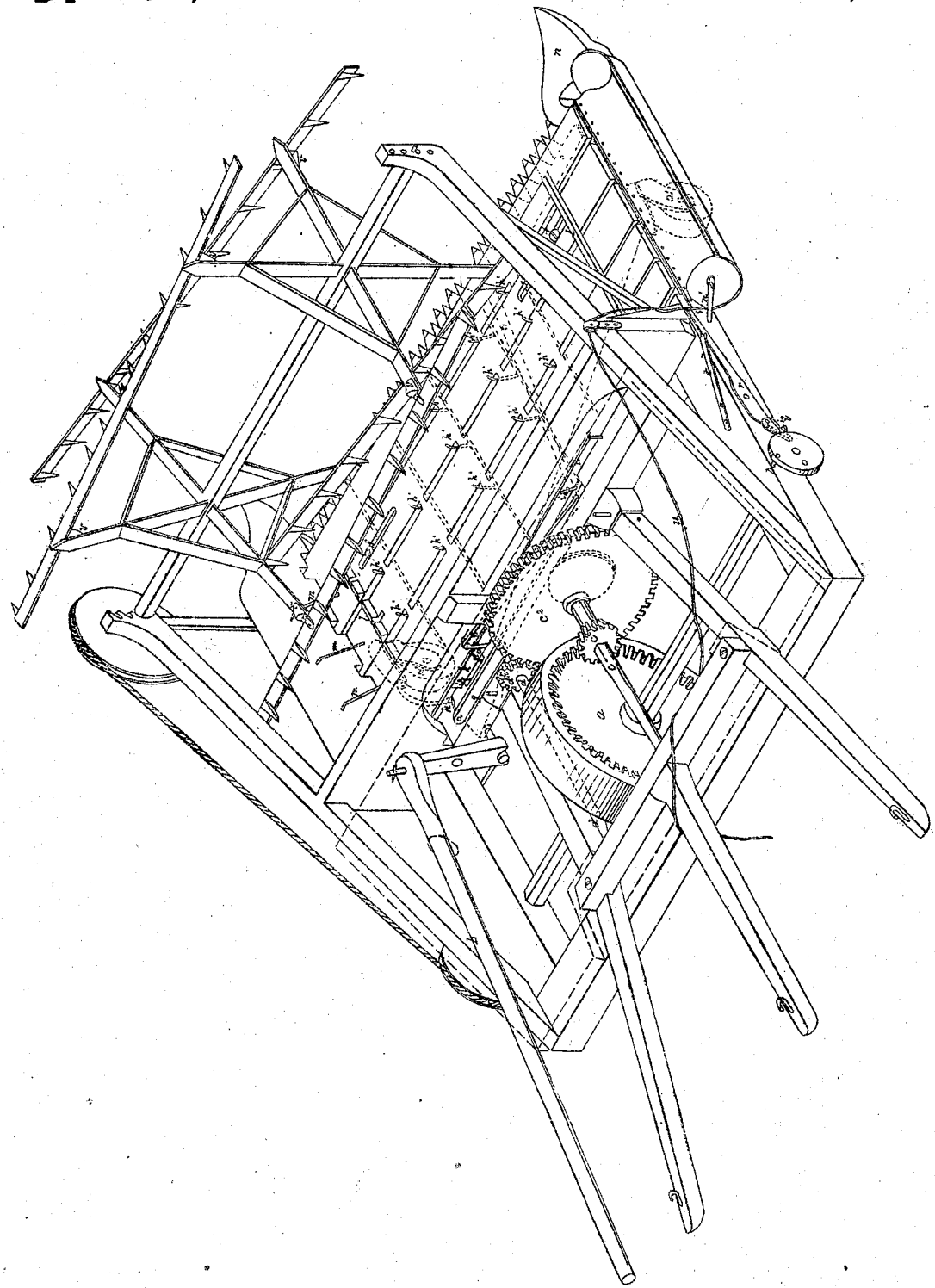

UNITED STATES PATENT OFFICE.

THOMAS VAN FOSSEN, OF LANCASTER, OHIO.

IMPROVEMENT IN GRAIN-HARVESTERS.

Specification forming part of Letters Patent No. 8,667, dated January 20, 1852.

*To all whom it may concern:*

Be it known that I, THOMAS VAN FOSSEN, of Lancaster, in the county of Fairfield and State of Ohio, have invented certain new and useful Improvements in Machines for Cutting and Harvesting Different Kinds of Grain; and I do hereby declare that the following is a full, clear, and exact description thereof, reference being had to the accompanying drawing and letters marked thereon, forming a part of this specification, in which is an isometrical view, with the covering of the after part of the machine removed, but its position represented in red lines, and other parts not visible are represented in dotted lines also.

The nature of my invention consists in certain new and useful improvements by which the standing grain, and particularly that portion which has been beaten down by the action of the wind and lodged between the standing grain, is raised and drawn more effectually under the action of the cutters, whereby the possibility of the machine passing over any portion of the grain, either standing or lodged, without cutting it clean will be prevented; and also in an improved arrangement for separating the cut grain, laying it straight, and passing it along upon the platform into the trough or bundle-measurer.

My improved device for bringing the grain more perfectly and effectually under the action of the cutters consists in providing the common reel in general use with hinged wings or slats with projecting teeth attached to them, said wings acting with their own weight as the reel revolves in such a manner as the teeth and slats shall assume a vertical position just as they come in contact with the grain, which has the effect to fall between the standing grain and under the beaten-down and lodged grain, so as to bring all more effectually to the action of the cutters.

My improved device for passing the cut grain straight along the platform consists of a series of teeth or fingers projecting a little above the platform through slots in the sliding platform. Said teeth are so operated upon as to catch and lay the grain straight upon the platform, while the sliding platform passes it along into the trough, from which it is discharged upon the ground. The construction and operation of these aforesaid devices will be hereinafter more fully described.

I construct the main frame of my machine pretty much as in the usual manner. I have one main wheel, which supports the after part of the machine, and by which the machinery is driven, and it is attached to the shaft extending across the whole width of the machine, and two other wheels, (represented in dotted lines,) $a'$ $a'$, which are placed under and support the platform. These front wheels are swivel-jointed and connected by an elbow-rod under the bottom of the platform, (represented in dotted lines,) which can be operated upon by the conductor by the lever $b$, so as to guide the machine as desired. This arrangement for steering or guiding the machine can be used or any other suitable device which will answer the same purpose.

The driving-wheel $a$ has beveled cogs cut on one side of it, say, about three inches from its circumference, to prevent the dirt from lodging or collecting in them. Crossing the shaft of the driving-wheel at right angles is a shaft, $c$, to which is attached a small pinion, $c'$, which meshes into the driving-wheel. This shaft crosses the main shaft above, and is slightly inclined for the purpose of keeping the wheel $c^2$ from touching the ground. On the opposite side of the driving-wheel to that of the shaft $c$, and crossing the main shaft, also at right angles and above it, is a shaft, $d$, with a small pinion, $d'$, attached to it, which meshes into the wheel $c^2$; and attached to it also is a crank, $d^2$, to which is connected a rod or pitman, $e$, jointed to a lever under the bottom of the platform, (shown in dotted lines,) having its fulcrum on the bottom bed of the platform-frame, and connected with a plate to which the cutters are connected, by which arrangement the desired reciprocating motion to the cutters is given.

The frame on which the sliding platform rests is formed of two beds, the upper one having slots cut through it corresponding with those cut in the platform to allow the teeth or fingers to rise and fall. The sliding platform is retained close to the bed by bolts or screws $f f$, but slides freely on the bolts in one direction to and fro, and it is reciprocated by the eccentric-rod $g$, operated by a cam or eccentric on the wheel $c^2$. (Shown in dotted lines.) This rod $g$ is jointed to a projecting arm, $h$, attached to the sliding platform.

The teeth or fingers $h'$ are attached to shafts extending across the bed-frame, working through staples driven in the under side of the same, and their inner ends are bent in the form of cranks, which pass through staples or holes at $i$ in a rod or beam, $k$. This rod $k$ has a long slot cut through it at one end, through which the projecting arm $h$ passes, and by which the platform, as it reciprocates, will draw the rod $k$ back and forth, and raise and depress the teeth or fingers $h'$, so that they will be depressed or drawn under when the sliding platform has arrived at the end of its stroke, and be raised above the platform, as represented in the drawings, so as to prevent the platform from carrying the grain back, when at the end of the returned stroke or motion of the platform. Thus by the combined action of the sliding platform and teeth the grain is alternately retained by the teeth and passed along by the platform into the trough.

On each end of the platform are ledges $l\ l$, which assist in keeping the grain straight, and from the frame to the upper bed of the platform-frame are braces $m\ m$, which arrest the grain and throw it over the ledge $l$ onto the platform.

I construct my trough of sheet-iron—that is to say, the frame of it—and have it long enough to receive the grain, and suspend it on one side of the machine at the end of the platform between a shoulder cut on the gatherer $n$ and a projecting arm, $n'$. The bottom of it is formed of canvas or other suitably-pliable substance, one side of which is secured to the side of the machine, and the other side to the trough-frame, so that the inner edge or frame of the trough, when the trough is canted, will straighten the bottom and discharge the contents of the trough. The manner in which I connect this trough with the machinery to discharge it at intervals is by attaching a small wheel, $o$, to the end of the main shaft with a pin, $p$, inserted in it, near its periphery, which, at each revolution of the main shaft, will impinge against a short arm or lever, $q$, which presses on a little lip or projection on the short arm of the lever $r$, the long arm of which is connected with the frame of the trough by a short connecting-rod, $s$. The action of the pin $p$ on the lever cants the trough and discharges its contents; but a spring, $t$, secured to the frame, springs the trough up again ready to receive another bundle of grain. The number of times which it will be necessary to empty this trough of course must depend upon the size of the machine; for an ordinary-sized machine once in each revolution of the main shaft or driving-wheel will be sufficient. This will drop the bundles about every ten feet; but should it be required to empty the trough at any time it is in the power of the conductor to do so by pulling the string $u$.

The reel I construct as in the usual manner, with the exception of providing the wings or slats with teeth, and having them hinged or jointed to arms. The wings are all hinged in one direction—that is to say, on opposite sides of the arms—so that they will fall in a vertical position as the reel revolves, just before entering the grain, and as they draw the grain under the action of the cutters they will assume a straight line with the arms at a time when most serviceable in that position to retain the grain while under the action of the cutters.

Immediately under the slats and attached to the arms of the reel, are small brackets or shelves $v$ for the wings or slats to rest or lodge against, so as to prevent them from falling completely over and to keep them in a vertical position as the reel comes in contact with the grain. The desired motion is communicated to this reel by a band passing round a pulley on its shaft from one of the driving-wheels.

I attach the shafts, between which the horses or animal-power is geared, to the center beam of the machine, just in rear of the platform, which has the effect of applying the power in a line which will have a tendency to keep the machine close to the ground and propel it with ease and regularity. Whereas, if the shafts were short and attached immediately to the outer or after beam, the power would not be applied to advantage, as the machine would have a tendency to rise behind, &c.

The front or steering wheels I propose to exchange for larger or smaller ones, as the case may be, for the purpose of raising the platform higher or depressing it nearer to the ground for different kinds of grain or grass.

Some parts of my machine I have deemed it unnecessary to describe particularly, as they are constructed in the manner of machines in general use, and any intelligent mechanic will understand how to construct it by reference to the drawing.

Having thus fully described my invention, what I claim therein as new, and desire to secure by Letters Patent, is—

1. Constructing the reel with hinged or jointed slats, having teeth projecting from them, whereby the grain is more effectually collected, raised, and drawn into the action of the cutters, substantially as described.

2. The combination of the teeth with the sliding platform, which teeth rise and fall at the desired time, alternately arresting and releasing the cut grain, whereby the reciprocating motion of the platform will keep the cut grain straight and constantly moving on the platform toward the trough, substantially as described.

In testimony whereof I have hereunto signed my name before two subscribing witnesses.

THOS. VAN FOSSEN.

Witnesses:
J. S. SMITH,
WM. P. ELLIOT.